United States Patent
Ito et al.

(10) Patent No.: US 9,776,561 B2
(45) Date of Patent: Oct. 3, 2017

(54) DISPLAY APPARATUS

(71) Applicant: DENSO CORPORATION, Kariya, Aichi-pref. (JP)

(72) Inventors: Hideki Ito, Kariya (JP); Kazumasa Kurokawa, Kariya (JP)

(73) Assignee: DENSO CORPORATION, Kariya, Aichi-pref. (JP)

( * ) Notice: Subject to any disclaimer, the term of this patent is extended or adjusted under 35 U.S.C. 154(b) by 0 days.

(21) Appl. No.: 14/907,586

(22) PCT Filed: Jul. 8, 2014

(86) PCT No.: PCT/JP2014/003616
§ 371 (c)(1),
(2) Date: Jan. 26, 2016

(87) PCT Pub. No.: WO2015/015719
PCT Pub. Date: Feb. 5, 2015

(65) Prior Publication Data
US 2016/0159275 A1   Jun. 9, 2016

(30) Foreign Application Priority Data

Jul. 30, 2013   (JP) .................................. 2013-157578

(51) Int. Cl.
*B60Q 3/02*   (2006.01)
*B60Q 3/04*   (2006.01)
(Continued)

(52) U.S. Cl.
CPC ............ *B60Q 3/0286* (2013.01); *B60K 35/00* (2013.01); *B60Q 3/14* (2017.02); *B60Q 3/76* (2017.02); *G01D 11/28* (2013.01); *G09F 13/04* (2013.01)

(58) Field of Classification Search
None
See application file for complete search history.

(56) References Cited

U.S. PATENT DOCUMENTS

| | | | | |
|---|---|---|---|---|
| 4,603,496 A | * | 8/1986 | Latz | ........................ G09F 9/33 313/500 |
| 2008/0205035 A1 | * | 8/2008 | Asvadi | ..................... G09F 9/33 362/103 |

(Continued)

FOREIGN PATENT DOCUMENTS

| JP | H3081654 U | 8/1991 |
|---|---|---|
| JP | 2511849 Y | 9/1996 |

(Continued)

OTHER PUBLICATIONS

International Search Report and Written Opinion (in Japanese with English Translation) for PCT/JP2014/003616, mailed Sep. 16, 2014; ISA/JP.

*Primary Examiner* — Ashok Patel
(74) *Attorney, Agent, or Firm* — Harness, Dickey & Pierce, P.L.C.

(57) ABSTRACT

A display apparatus includes: a substrate having a first surface; a light source that is disposed to the first surface of the substrate; a display plate that is disposed adjacent to the first surface of the substrate; and a light block body that surrounds the light source between the substrate and the display plate. The light source includes a light source body that emits light, a light source base material that has a mount surface, the light source body being mounted to the mount surface, and a mold portion that transmits the light and covers a circumference of the light source body on the mount surface of the light source base material. The mount surface is positioned closer to the display plate than an end face of the light block body, the end face being adjacent to the substrate.

8 Claims, 5 Drawing Sheets

(51) Int. Cl.
*B60K 35/00* (2006.01)
*G01D 11/28* (2006.01)
*G09F 13/04* (2006.01)
*B60Q 3/76* (2017.01)
*B60Q 3/14* (2017.01)

(56) References Cited

U.S. PATENT DOCUMENTS

2011/0170289 A1* 7/2011 Allen ..................... F21V 13/12
362/235
2012/0069547 A1* 3/2012 Gielen ..................... F21K 9/54
362/84
2013/0272740 A1 10/2013 Nakagawa et al.

FOREIGN PATENT DOCUMENTS

| JP | 2000284732 A | 10/2000 |
| JP | 2000348517 A | 12/2000 |
| JP | 2004233466 A | 8/2004 |
| JP | 2005043215 A | 2/2005 |
| JP | 2010122062 A | 6/2010 |
| JP | 2010182809 A | 8/2010 |
| JP | 2013191835 A | 9/2013 |
| JP | 2014115345 A | 6/2014 |

* cited by examiner

DISPLAY APPARATUS

CROSS-REFERENCE TO RELATED APPLICATIONS

This application is a U.S. National Phase Application under 35 U.S.C. 371 of International Application No. PCT/JP2014/003616 filed on Jul. 8, 2014 and published in Japanese as WO 2015/015719 A1 on Feb. 5, 2015. This application is based on and claims the benefit of priority from Japanese Patent Application No. 2013-157578 filed on Jul. 30, 2013. The entire disclosures of all of the above applications are incorporated herein by reference.

TECHNICAL FIELD

The present disclosure relates to a display apparatus that causes light from a light source to be recognized at a display plate.

BACKGROUND ART

A display apparatus has been known in which a light source is disposed to one surface of a substrate. A display plate is similarly disposed to the one surface of the substrate so as to be separated from the substrate. Light from a light source is recognized by the display plate. A light block body is provided between the substrate and the display plate so as to surround the light source. Light from the light source is guided to the display plate. A user is notified of the light from the light source according to a light emission mode of the light source that is confirmed by the display plate.

As the display apparatus, multiple light sources are divided by a light block body. In this configuration, when light of the light source leaks from a gap between an end face of the light block body on a substrate side and the substrate, it may be erroneously recognized that an adjacent light source is turned on due to light leakage, even when the light source turns off. Thus, another apparatus has been proposed attempting to prevent light leakage by inserting a conductive paste into the gap between the substrate and the end face of the light block body on a substrate side (referring to Patent literature 1).

PRIOR ART DOCUMENT

Patent Document

Patent literature 1: JP 2005-43215 A

The inventors of the present application have found the following regarding a display apparatus.

In the apparatus disclosed in Patent literature 1, a member (a light leakage prevention member) such as a conductive paste for preventing light leakage is used. Thus, a configuration may be complicated.

SUMMARY OF THE INVENTION

It is an object of the present disclosure to provide a technique for suppressing light leakage from an adjacent light source with a simple configuration.

According to one aspect of the present disclosure, a display apparatus includes a substrate, a light source, a display plate, and a light block body. The substrate has a first surface. The light source is disposed to the first surface of the substrate. The display plate is disposed adjacent to the first surface of the substrate. The light block body surrounds the light source between the substrate and the display plate. The light source includes a light source body, a light source base material, and a mold portion. The light source body emits light. The light source base material has a mount surface, the light source body being mounted to the mount surface. The mold portion transmits the light and covers a circumference of the light source body on the mount surface of the light source base material. The mount surface is positioned closer to the display plate than an end face of the light block body, the end face being adjacent to the substrate.

According to the display apparatus of the present disclosure, it may be possible to prevent light emitted toward the display plate from the light source from leaking from a gap that may be generated between the substrate and the end face close to the substrate in the light block body. Thus, it may be possible to suppress light leakage from an adjacent light source with a simple configuration, and to prevent from occurring erroneous recognition due to the light leakage.

BRIEF DESCRIPTION OF THE DRAWINGS

The above and other objects, features and advantages of the present disclosure will become more apparent from the following detailed description made with reference to the accompanying drawings. In the drawings.

PREFERRED EMBODIMENTS FOR CARRYING OUT THE INVENTION

An embodiment of the present disclosure will be described with reference to the drawings.
(Overall Configuration)

Figure 1:
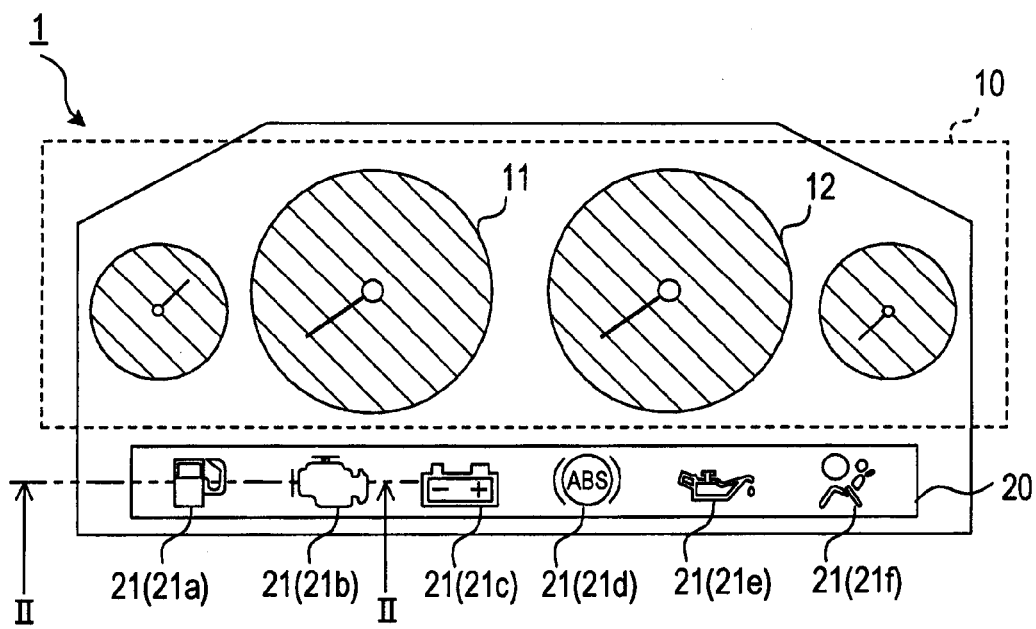
FIG. 1 is a diagram illustrating a schematic configuration of a combination meter.

FIG. 1 illustrates an example of a combination meter 1 provided to an installment panel of a vehicle, as an example of a display apparatus to which the present disclosure is applied. The combination meter 1 includes a meter portion 10 having various meters such as a speed meter 11 and a tachometer 12. The combination meter 1 includes a centralized display portion 20 disposed below the meter portion 10. The centralized display portion 20 includes multiple display portions 21 that are disposed in a row so as to be adjacent to each other. The display portions 21 notify an occupant of a situation of each portion of the vehicle according to the light emission mode.

Specifically, the centralized display portion 20 includes, as the display portions 21, a residual fuel display portion 21a that notifies a reduction in a residual amount of fuel in a fuel tank, an engine display portion 21b that notifies an abnormality of an engine system, and a battery display portion 21c that notifies an abnormality of a battery system. In addition, the centralized display portion 20 includes, as the display portions 21, a display portion 21d that notifies an abnormality of an ABS system, a display portion 21e that notifies an abnormality of an oil system, and a display portion 21f that notifies an abnormality of an airbag system. The centralized display portion 20 may include another display portion that notifies various situations of the vehicle.

Figure 2:
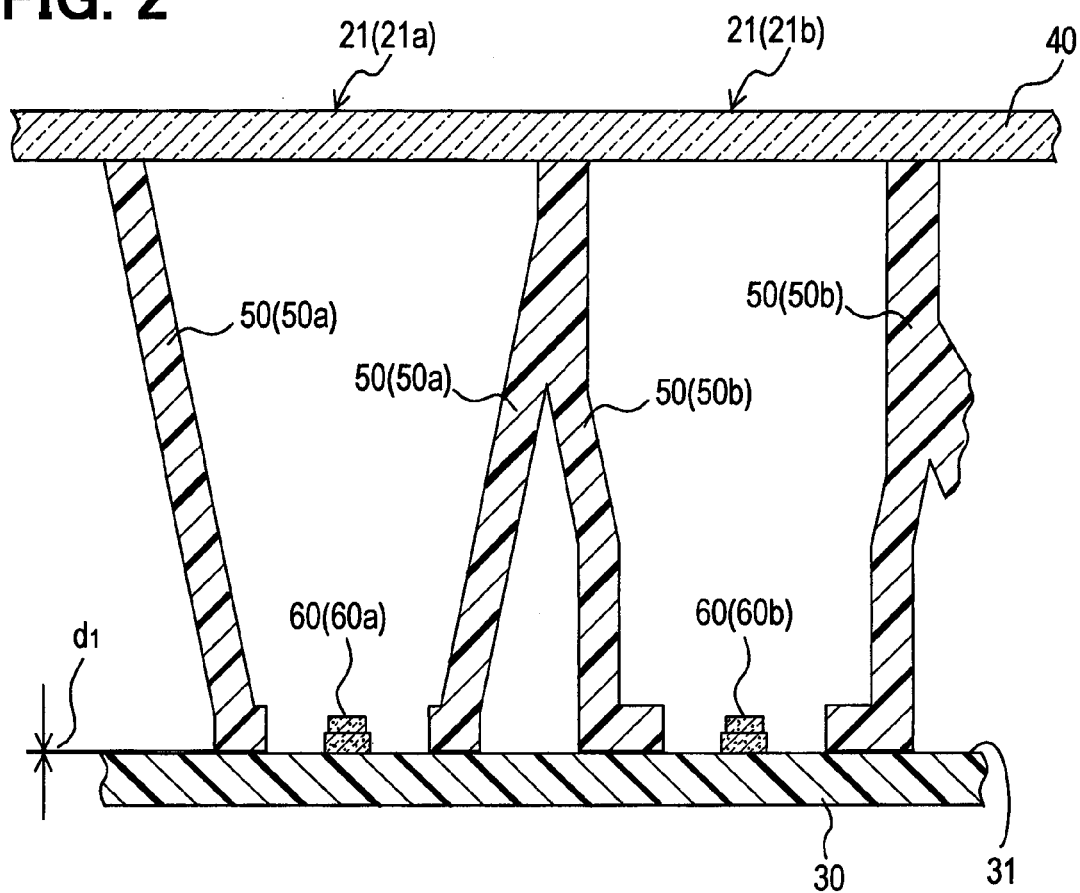
FIG. 2 is a diagram illustrating a schematic cross section taken along line II-II of FIG. 1.

FIG. 2 is a cross-sectional view when an II-II cross section of the centralized display portion 20 illustrated in FIG. 1 is seen from a direction of an arrow. The centralized display portion 20 includes at least a substrate 30, a display plate 40, a light block body 50, and a light source 60. A cross section of the centralized display portion 20 is configured in the same manner as any of the display portions 21a to 21f. The configuration of the centralized display portion 20 will be described below with the II-II cross section as an example. When the individual display portions 21a to 21f are not distinguished, the display portions will be simply described as the display portion 21. In addition, regarding a configuration corresponding to the individual display portions 21a to 21f (the light block body 50 and the light source 60 ), a sign of "a" to "f" after the reference numeral denoting the configuration is added like, for example, a "light source 60a".

The substrate 30 is a printed circuit board, and at least the light source 60 (corresponding to 60a and 60b in FIG. 2) is disposed to one surface (a first surface) of the substrate 30 at a position corresponding to the display portion 21 (corresponding to 21a and 21b in FIG. 2). The same total number of light sources 60 as the total number of display portions 21 is disposed. The light sources 60 is turned on in response to a control signal from a control unit, not shown, which is mounted to a vehicle. The one surface of the substrate 30 may be referred to as a first surface, and the other surface of the substrate 30 may be referred to as a second surface.

The display plate 40 is made of a resin transmitting light, and is disposed separately from a surface (a mount surface) 31 of the substrate 30 to which the light source 60 is disposed. The display plate 40 is disposed adjacent to the surface 31 of the substrate 30. A display pattern indicating the notified information by each of the display portions 21 is printed to the display plate 40. Specifically, for example, a display pattern warning a reduction in fuel is printed to the residual fuel display portion 21a, and a display pattern warning the abnormality of an engine system is printed to the engine display portion 21b, for example.

The light block body 50 is made of a material which has a property of blocking light from the light source 60 like white polypropylene (PP), and is interposed between the substrate 30 and the display plate 40. The light block body 50 surrounds the corresponding light source 60 for each display portion 21. The light block body 50 may have a tubular shape. Specifically, a light block body 50a has a tubular shape surrounding the light source 60a. A light block body 50b has a tubular shape surrounding the light source 60b.

When light emitted from the light source 60 passes through the display plate 40, an occupant of the vehicle recognizes a display pattern printed to the display plate 40 through each of the display portions 21.

The light block body 50 is interposed between the substrate 30 and the display plate 40. A gap may be provided between the mount surface 31 of the substrate 30 and an end face 501 of the light block body 50, the end face 501 being adjacent to the substrate 30, since there may be, for example, a warpage or torsion of the substrate 30. In the present embodiment, a maximum value of the gap is supposed to be d1.

Figure 3:
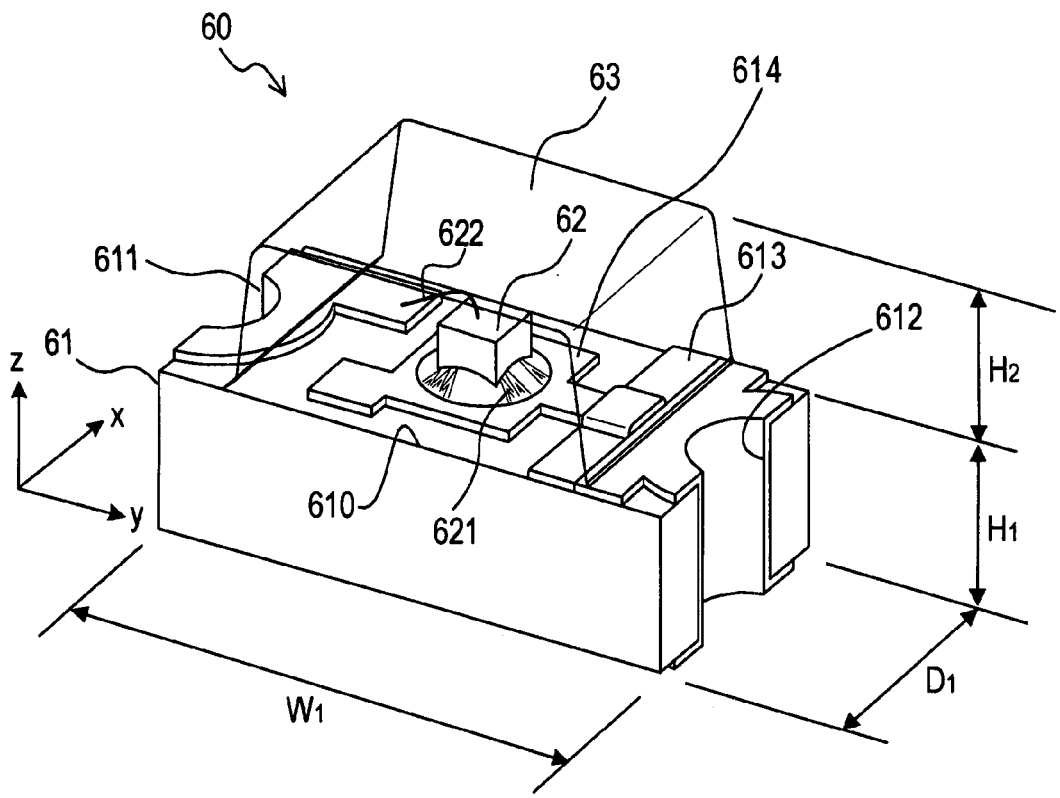
FIG. 3 is a perspective view illustrating a schematic configuration of an LED package.

The light source 60 is a light emission diode package (hereinafter, referred to as an LED package) including a light emission diode chip (hereinafter, referred to as an LED chip). The LED package includes an LED package which has a reflector (hereinafter, referred to as an LED package with a reflector) that reflects light emitted from the LED chip to limit directional characteristics, and an LED package which does not have the reflector (hereinafter, referred to as an LED package with no reflector). The light source 60 of the present embodiment is an LED package with no reflector. The light source 60 includes an LED base material 61, an LED chip 62, and a resin mold portion 63 as illustrated in FIG. 3. The light source 60 may be also referred to as an LED package 60.

The LED base material 61 is made of a BT resin. The LED base material 61 is formed into a substantially rectangular parallelepiped having an x-axis direction shown in the drawing as a depth, a y-axis direction as a width, and a z-axis direction as a height. The depth, the width, and the height are denoted by D1, W1, and H1, respectively. The LED base material 61 is a base that holds the LED chip 62, and both ends of the LED base material 61 in the width direction are provided with terminals (referred to as package terminals) 611 and 612, respectively. A polarity display mark 613 is made of an epoxy resin and a pigment, and indicates the polarity of the LED chip 62. The polarity display mark 613 is disposed adjacent to the terminal 612. Wiring patterns extending from the respective package terminals 611, 612 are formed on one surface 610 in the height direction. One of the wiring patterns extends to substantially the center of the LED base material, and forms a mounting seat 614 to which the LED chip is mounted. In the LED base material 61, the surface 610 to which the mounting seat 614 is formed will be referred to as an LED mount surface 610.

In the present embodiment, the LED package 60 is provided so that the height H1 of the LED base material 61 is set to a value equal to or greater than a maximum value d1 that is assumed with respect to the gap (H1≥d1). Thus, in the LED package 60, the LED mount surface 610 is positioned closer to the display plate 40 than the end face 501 of the light block body 50 on a side of the substrate 30. In other words, the LED mount surface 610 is positioned closer to the display plate 40 than the end face 501 of the light block body 50, the end face 501 being adjacent to the substrate 30.

The LED chip 62 includes two terminals. One of the terminals is electrically bonded to the mounting seat 614 by a silver (Ag) paste 621, and the other is connected to the other wiring pattern (a wiring pattern without the mounting seat 614 ) by a gold (Au) line 622. In this manner, the LED chip 62 is mounted to substantially the center of the LED base material 61. For protection, the circumference of the LED chip 62 is molded by an epoxy resin that is a material transmitting light on the LED mount surface 610.

This mold portion (a resin mold portion) 63 is formed into a substantially rectangular parallelepiped, and the height of the resin mold portion from the LED mount surface 610 is set to H2. In the LED package 60, when the package terminals 611, 612 are electrically connected, light from the LED chip 62 is extracted to the outside (an air layer) through the resin mold portion 63.

Figure 4:
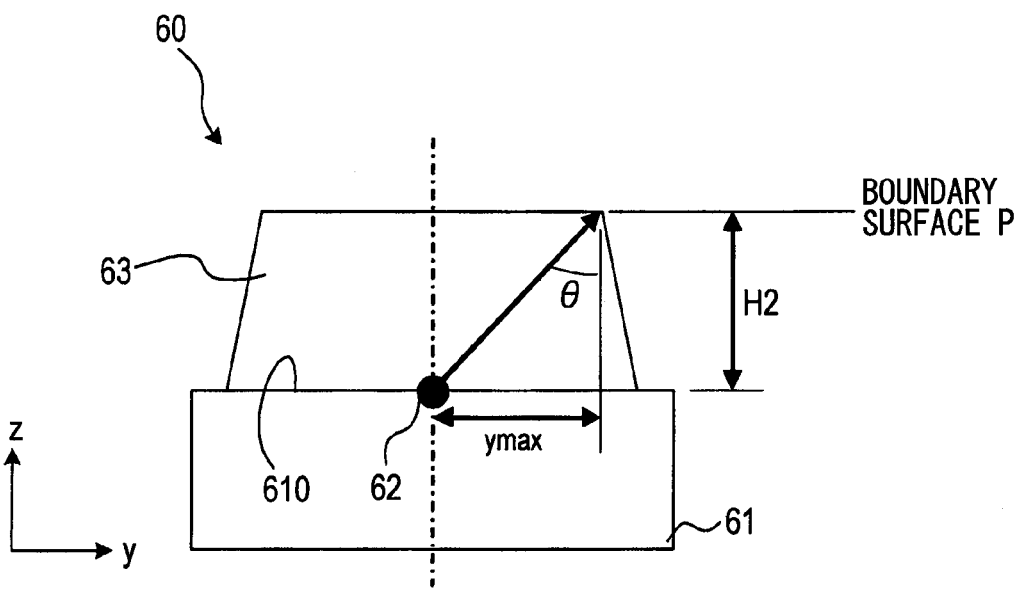
FIG. 4 is a diagram illustrating a relationship between light emitted from an LED chip and the LED package.

As illustrated in FIG. 4, it is supposed that the LED chip 62 is a point light source, a boundary between the resin mold portion 63 and the air is set to be a boundary surface P, an angle of incidence of light emitted from the LED chip 62 on the boundary surface P is set to be θ, and a maximum value of a component (a y direction component in FIG. 4) that is parallel to the LED mount surface 610 in paths of the light from the point light source (the LED chip 62) to the boundary surface P when the light is reflected from the boundary surface P is set to be ymax. In addition, it is supposed that a refractive index of the air is set to 1, and a refractive index of an epoxy resin (the resin mold portion 63) at this time is set to n (1<n). In the present embodiment, particularly, in the LED package 60, the thickness H2 of the resin mold portion 63 is set to satisfy the following expression (1).

$$H2 > \sqrt{(n^2-1)} \times y\,\text{max} \qquad \text{(Expression 1)}$$

Figure 5:
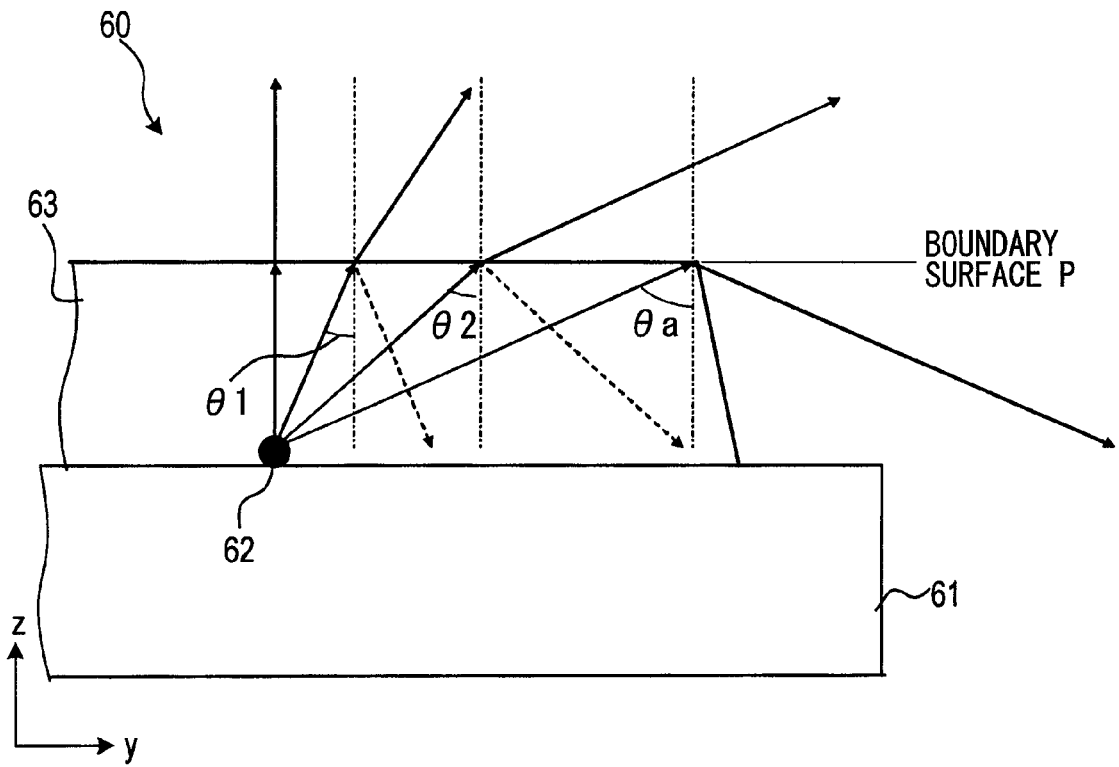
FIG. 5 is a diagram illustrating a path at a boundary surface between a resin mold portion and air with regard to light emitted from the LED chip.

The expression (1) will be explained. The light emitted from the LED chip 62 is reflected (partially reflected) from the boundary surface P between an epoxy resin and the air like paths illustrated in FIG. 5 like angles θ1, θ2 of incidence (in the case of the angle θ of incidence >0). The light transmitted to the outside is refracted and travels upward illustrated in FIG. 5. When the angle θ of the incidence on the boundary surface P satisfies a total reflection condition represented by an expression (2), the light emitted from the LED chip 62 and having passed through the epoxy resin is totally reflected by the boundary surface P like the path illustrated in FIG. 5 as an angle θa of incidence, and is emitted further downward than the LED mount surface 610.

$$\sin\theta \geq \frac{1}{n} \qquad \text{(Expression 2)}$$

When the LED package 60 is mounted to the substrate 30, the light emitted further downward than the LED mount surface 610 may leaks from a gap. A user may erroneously recognize that an adjacent display portion is turned on. In particular, the light totally reflected by the boundary surface P has high intensity, and thus it is preferable to suppress the total reflection by the boundary surface P in order to suppress erroneous recognition due to light leakage. A condition for preventing total reflection by the boundary surface P is represented by an expression (3).

$$\sin\theta < \frac{1}{n} \qquad \text{(Expression 3)}$$

A conditional expression obtained by substituting tan θ=ymax/H2 from FIG. 4 into the expression (3) with respect to the thickness H2 of the resin mold portion 63 is the expression (1). The condition represented by the expression (1) is referred to as a mold thickness setting condition.
(Effects)

Figure 6:
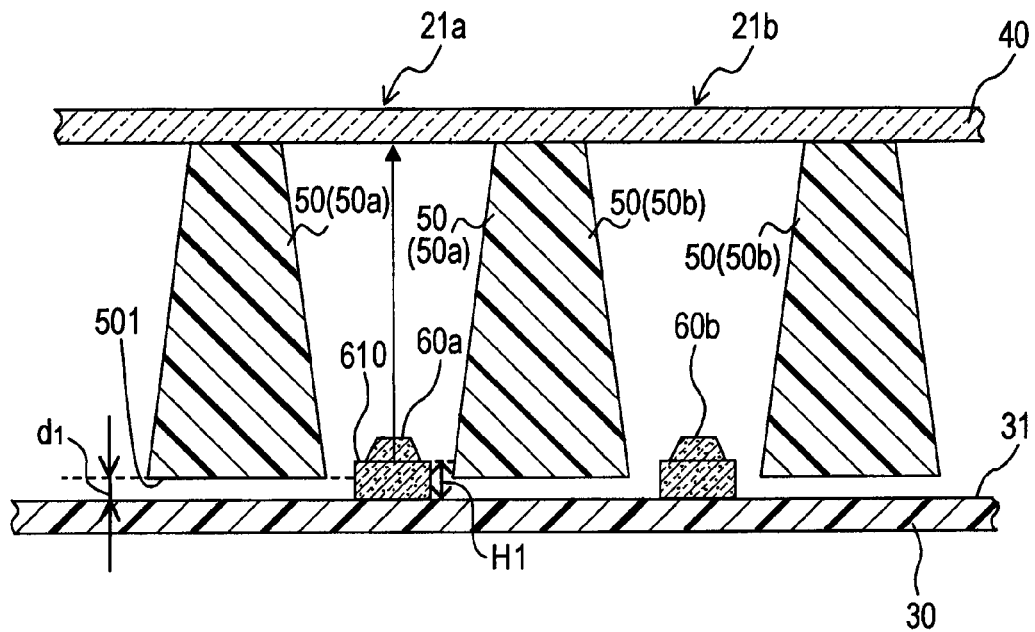
FIG. 6 is a diagram schematically showing the schematic cross section of FIG. 2 and illustrating effects.

In the combination meter 1 of the present embodiment, as illustrated in FIG. 6, the LED package 60 is configured so that the LED mount surface 610 is positioned further distant from the substrate 30 than the gap (the maximum value d1) (thickness H1 of the LED base material ≥d1). Therefore, it may be possible to prevent light emitted from the LED package 60 toward the display plate 40 from leaking from the gap. Further, the thickness H2 of the resin mold portion 63 is provided so as to satisfy the mold thickness setting condition (the expression (1)). It may be possible to prevent the light emitted from the LED package 60 from being totally reflected by the boundary surface P. Thus, even when the light emitted from the LED package 60 toward the substrate 30 is generated, the light is mainly restricted to low intensity light due to the partial reflection.

Figure 7A:
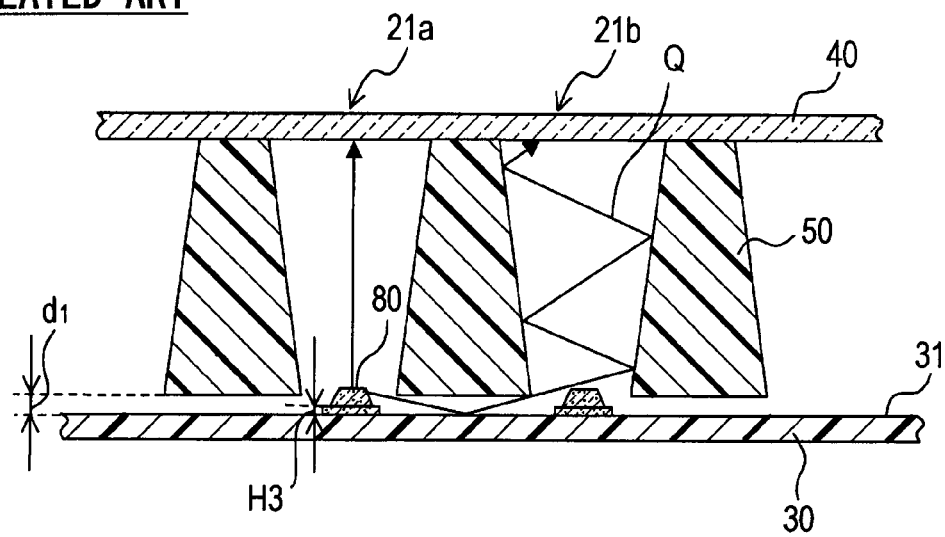
FIG. 7A is a diagram illustrating a configuration in which an LED package different from the present embodiment is mounted to a substrate, the LED package having an LED mount surface being positioned closer to the substrate than to an end face of a light block body on a substrate side.
Figure 7B:
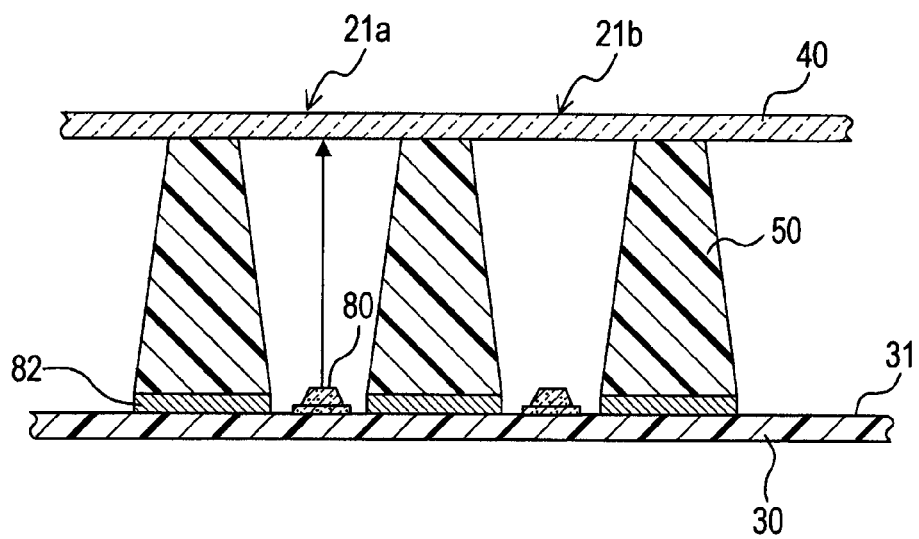
FIG. 7B is a diagram illustrating an example that light leakage is prevented with a light leakage prevention member.

For comparison, FIG. 7A illustrates a configuration in which an LED package 80 (thickness H3 of the LED base material <d1) that is different from the LED package 60 of the present embodiment is mounted to the substrate 30, the LED package 80 having an LED mount surface being positioned closer to the substrate 30 than the end face 501 of the light block body 50 adjacent to the substrate 30. In this case, the light from the LED package 80 passes through the display portion 21*a*, and the light leaking from the gap goes along a path Q and passes through the adjacent display portion 21*b*. Thus, it seems as if the display portion 21*b* is also turned on together with the display portion 21*a*, causing an erroneous recognition. In this case of the configuration illustrated in FIG. 7A, in order to reduce the erroneous recognition due to light leakage, it may be necessary to insert a light leakage prevention member 82 between the end face 501 of the light block body 50 and the substrate 30 as illustrated in FIG. 7B.

By contrast, according to the present embodiment, it may be possible to suppress the light leakage from the gap with the simple configuration. The erroneous recognition due to light leakage may be less likely to occur.

In the present embodiment, the LED with no reflector is used as the LED package 60. In general, the LED with no reflector has an advantage in that it may be possible to reduce the size (thickness) of the package and the manufacturing cost as compared to an LED with a reflector. The LED with no reflector has a feature that a directional angle is large as compared to the LED with a reflector.

Light from an LED with no reflector is diffused and emitted to the substrate 30 together with the display portions 21 in general, and thus the light diffused and emitted to the substrate 30 may leak from the gap. By contrast, in the present embodiment, even when an LED with no reflector is used, the light leakage is suppressed by adopting the above mentioned configuration. Thus, it may be possible to reduce the size and weight of the combination meter 1 and to achieve cost reduction.

Incidentally, in the LED package 60, the thickness of the resin mold portion 63 is set to satisfy the mold thickness setting condition (referring to the expression (1)) so that the light emitted from the LED chip 62 is prevented from being emitted to the substrate 30 over the LED mount surface 610.

Figure 8A:
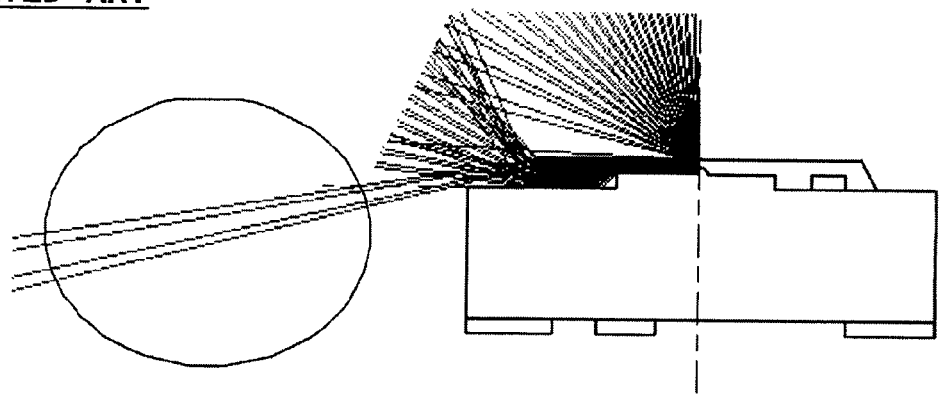
FIG. 8A is a diagram illustrating a result of simulation of paths of light from the LED chip in the LED package that does not satisfy a mold thickness setting condition.
Figure 8B:
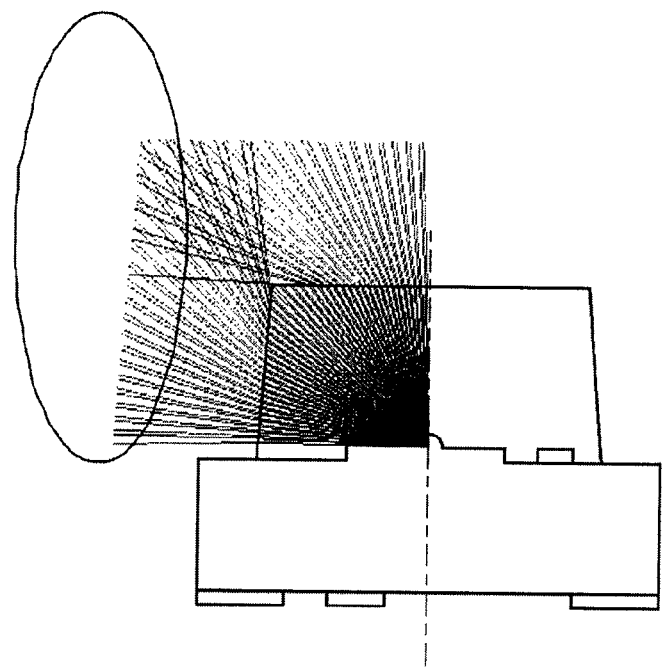
FIG. 8B is a diagram illustrating a result of simulation of paths of light from the LED chip in the LED package that satisfies the mold thickness setting condition.

FIG. 8A and FIG. 8B illustrate a result of simulation when the thickness of a resin mold portion is changed using the same LED base material. As illustrated in FIG. 8A, in an LED package that does not satisfy the mold thickness setting condition, it is confirmed that light is emitted further downward than a mount surface of the LED base material (see a circle). By contrast, as illustrated in FIG. 8B, in an LED package that satisfies the mold thickness setting condition, it is confirmed that light is prevented from being emitted further downward than a mount surface of the LED base material (see a circle).

The LED package 60 corresponds to an example of a light source, the LED chip 62 corresponds to an example of a light source body, the LED base material 61 corresponds to an example of a light source base material, and the resin mold portion 63 corresponds to an example of a mold portion.

(Other Embodiments)

The embodiment of the present disclosure has been described. However, the present disclosure is not limited to the embodiment, and can be implemented in various aspects without departing from the scope of the present disclosure.

In the embodiment, the present disclosure is applied to a combination meter of a vehicle. The range of the application of the present disclosure is not limited. A display apparatus applied to another apparatus other than a vehicle such as a control device performing various controls, a household electrical appliance, may be used as long as the display apparatus has the similar configuration in which adjacent display portions are included. The display portion may be configured not only to display a display pattern but also to display a display pattern and to function as a switch.

In the embodiment, an LED with no reflector package is used as a light source. The light source to be applied is not limited. An LED package with a reflector may be used, or a light source other than an LED package may be used.

In the embodiment, a configuration is adopted in which a member (light leakage prevention member) that does not transmit light is not embedded in a gap between the substrate 30 and the end face 501 of the light block body 50 adjacent to the substrate 30. The present disclosure is not limited. The light leakage prevention member may be embedded to the gap.

A function of one component in the embodiment may be dispersed as multiple components, or functions of multiple components may be integrated into one component. In addition, at least a portion of the configuration in the embodiment may be replaced with a well-known configuration having the same function. In addition, a portion of the configuration in the embodiment may be omitted so far as the problem can be solved. In addition, at least a portion of the configuration in the embodiment may be added to or replaced with another configuration in the embodiment. Meanwhile, all aspects included in a technical idea specified from the wording described in claims are embodiments of the present disclosure.

A display apparatus according to one aspect of the present disclosure includes a substrate, a light source disposed to a first surface of the substrate, a display plate disposed adjacent to the first surface of the substrate, and a light block body surrounding the light source between the substrate and the display plate. The light source includes a light source body that emits light, a light source base material that has a mount surface to which the light source body is mounted, and a mold portion that covers the circumference of the light source body on the mount surface of the light source base material and transmits light. The mount surface of the light source base material is positioned closer to the display plate than an end face of the light block body, the end face being adjacent to the substrate. Thus, a distance between the display plate and the mount surface of the light source base material is shorter than a distance between the display plate and the end face of the light block body that is close to the substrate.

Therefore, it may be possible to prevent light emitted from the light source toward the display plate from leaking from a gap that may be generated between the substrate and the end face of the light block body. Thus, it may be possible to suppress light leakage from an adjacent light source with a simple configuration. Erroneous recognition due to the light leakage may be less likely to occur.

In the display apparatus of the present disclosure, the thickness of the mold portion may be provided to satisfy a mold thickness setting condition, which is a condition in which light emitted from the light source body is not totally reflected at a boundary between the mold portion and the air. The mold thickness setting condition is set as represented by, for example, the expression (1).

$$H2 > \sqrt{(n^2-1)} \times y\,max \qquad \text{(Expression 1)}$$

A thickness of the mold portion is set to H2. When a refractive index of air is supposed to be equal to 1, a refractive index of the mold portion is set to n. When the light source body is supposed to be a point light source, a maximum value of a component parallel to a mount surface in a path of light directed to the boundary between the mold portion and air from the point light source is set to be ymax.

The light from the light source body may be not only emitted toward the display plate but also emitted further toward the substrate than the mount surface of the light source base material by partial reflection or total reflection at the boundary between the mold portion and air. The reflected light emitted to the substrate by total reflection has higher intensity than the reflected light emitted to the substrate by partial reflection. Accordingly, when the light leaks from the gap that may be generated between the substance and the end face of the light block body adjacent to the substrate, the erroneous recognition may occur.

In this respect, in the present disclosure, the thickness of the mold portion is set to satisfy the mold thickness setting condition, and it may be possible to prevent light emitted from the light source body from being totally reflected at the boundary between the mold portion and air. Therefore, even when light emitted toward the substrate (an opposite direction to the display plate when seen from the light source body) from the light source is generated, the light is mainly restricted to low intensity light due to partial reflection. Light leakage from an adjacent light source is suppressed with a simple configuration, and erroneous recognition due to the light leakage may be less likely to occur.

The embodiments and the configuration of the display apparatus according to the present disclosure have been illustrated in the above. However, the embodiment, the configuration, and the aspect according to the present disclosure are not restricted to each embodiment, each configuration, and each aspect which have been described above. For example, the embodiment, configuration, and aspect which are obtained by combining suitably the technical part disclosed in different embodiments, configurations, and aspects are also included in the range of the embodiments, configurations, and aspects according to the present disclosure.

What is claimed is:

1. A display apparatus comprising:
   a substrate having a light source surface;
   a light source that is disposed to the light source surface of the substrate;
   a display plate that is disposed adjacent to the light source surface of the substrate;
   a light block body that surrounds the light source between the substrate and the display plate; and
   a gap provided between an end face of the light block body on a substrate side and the substrate,
   wherein:
   the light source includes
     a light source body that emits light,
     a light source base material that has a mount surface, the light source body being mounted to the mount surface, and a different surface contacting with the light source surface of the substrate when the light source is mounted to the substrate, and a mold portion that transmits the light and covers a circumference of the light source body on the mount surface of the light source base material; and the mount surface is positioned closer to the display plate than the end face of the light block body, the end face being adjacent to the substrate.

2. The display apparatus according to claim 1, wherein:

a thickness of the mold portion satisfies a mold thickness setting condition, which is a condition in which the light emitted from the light source body is not totally reflected at a boundary between the mold portion and air.

3. The display apparatus according to claim 2, wherein:

the mold thickness setting condition satisfies an expression 1, $$H2 > \sqrt{(n^2-1)} \times y\max \quad \text{(Expression 1);}$$

the thickness of the mold portion is expressed by H2, a refractive index of the mold portion is expressed by n when a refractive index of the air is set to 1; and a maximum value of a component parallel to the mount surface in a path of light toward the boundary between the mold portion and the air from a point light source is expressed by ymax, when the light source body is set to be a point light source.

4. The display apparatus according to claim 1, wherein:

the light source body is provided by a light emission diode chip;

the light source is provided by a light emission diode package including the light emission diode chip; and the light emission diode package has no reflector.

5. The display apparatus according to claim 1, wherein:

the display apparatus is mounted to a vehicle.

6. A display apparatus comprising:

a substrate having a first surface;

a light source that is disposed to the first surface of the substrate;

a display plate that is disposed adjacent to the first surface of the substrate; and a light block body that surrounds the light source between the substrate and the display plate, wherein:

the light source includes a light source body that emits light, a light source base material that has a mount surface, the light source body being mounted to the mount surface, and a mold portion that transmits the light and covers a circumference of the light source body on the mount surface of the light source base material, a thickness of the mold portion satisfies a mold thickness setting condition, which is a condition in which the light emitted from the light source body is not totally reflected at a boundary between the mold portion and air, the mold thickness setting condition satisfies an expression 1, $$H2 > \sqrt{(n^2-1)} \times y\max \quad \text{(Expression 1);}$$

the thickness of the mold portion is expressed by H2, a refractive index of the mold portion is expressed by n when a refractive index of the air is set to 1, and a maximum value of a component parallel to the mount surface in a path of light toward the boundary between the mold portion and the air from a point light source is expressed by ymax, when the light source body is set to be a point light source; and the mount surface is positioned closer to the display plate than an end face of the light block body, the end face being adjacent to the substrate.

7. The display apparatus according to claim 6, wherein:

the light source body is provided by a light emission diode chip;

the light source is provided by a light emission diode package including the light emission diode chip; and the light emission diode package has no reflector.

8. The display apparatus according to claim 6, wherein:

the display apparatus is mounted to a vehicle.

* * * * *